United States Patent
Ishizaki et al.

(10) Patent No.: US 11,623,297 B2
(45) Date of Patent: Apr. 11, 2023

(54) INDIRECT SPOT WELDING APPARATUS AND WELDING METHOD

(71) Applicant: MAZDA MOTOR CORPORATION, Hiroshima (JP)

(72) Inventors: Naotake Ishizaki, Hiroshima (JP); Tomohiro Eiju, Hiroshima (JP); Akinori Shibata, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 870 days.

(21) Appl. No.: 16/579,537

(22) Filed: Sep. 23, 2019

(65) Prior Publication Data

US 2020/0101557 A1   Apr. 2, 2020

(30) Foreign Application Priority Data

Sep. 27, 2018 (JP) .............................. JP2018-181295

(51) Int. Cl.
*B23K 11/11* (2006.01)
*B23K 11/31* (2006.01)

(52) U.S. Cl.
CPC .......... *B23K 11/115* (2013.01); *B23K 11/312* (2013.01)

(58) Field of Classification Search
CPC .... B23K 11/115; B23K 11/312; B23K 11/315
USPC ....................... 219/86.25, 86.8, 87
See application file for complete search history.

(56) References Cited

U.S. PATENT DOCUMENTS 5,030,814 A    7/1991 Tange et al.
9,505,078 B2*  11/2016 Hasegawa ............ B23K 11/312
2007/0175868 A1* 8/2007 Christensen .......... B23K 11/115
                                              219/86.25
2011/0272384 A1  11/2011 Matsushita et al.
2012/0055904 A1   3/2012 Sakai

FOREIGN PATENT DOCUMENTS

| CN | 102430852 A | 5/2012 |
| CN | 104551362 A | 4/2015 |
| CN | 206382694 U | 8/2017 |
| JP | H02-022276 U | 2/1990 |
| JP | H04-028704 Y2 | 7/1992 |
| JP | 2006-159235 A | 6/2006 |
| JP | 2010-194609 A | 9/2010 |
| JP | 2016-059937 A | 4/2016 |

* cited by examiner

*Primary Examiner* — Dana Ross
*Assistant Examiner* — James F Sims, III
(74) *Attorney, Agent, or Firm* — Studebaker & Brackett PC (57) ABSTRACT

An indirect spot welding apparatus includes a welding electrode that is brought into pressure contact with one of surfaces of a plurality of plate-shaped members that are objects to be welded in one side in a stacking direction of the plate-shaped members, a ground electrode that is brought into pressure contact with the one of the surfaces in the one side or another one of the surfaces in the other side in the stacking direction in a position shifted from an axial center of the welding electrode, and an opposed member disposed coaxially with the ground electrode to be opposed to the ground electrode so as to hold at least one of the plate-shaped members between the opposed member and the ground electrode, and the welding electrode is mechanically integrated with the ground electrode to be movable in a direction parallel to an axial direction of the ground electrode.

20 Claims, 9 Drawing Sheets

INDIRECT SPOT WELDING APPARATUS AND WELDING METHOD

CROSS-REFERENCE TO RELATED APPLICATION

This application claims priority to Japanese Patent Application No. 2018-181295 filed on Sep. 27, 2018, the entire disclosure of which is incorporated by reference herein.

BACKGROUND

The present disclosure relates to an indirect spot welding apparatus and a welding method.

Figure 10:
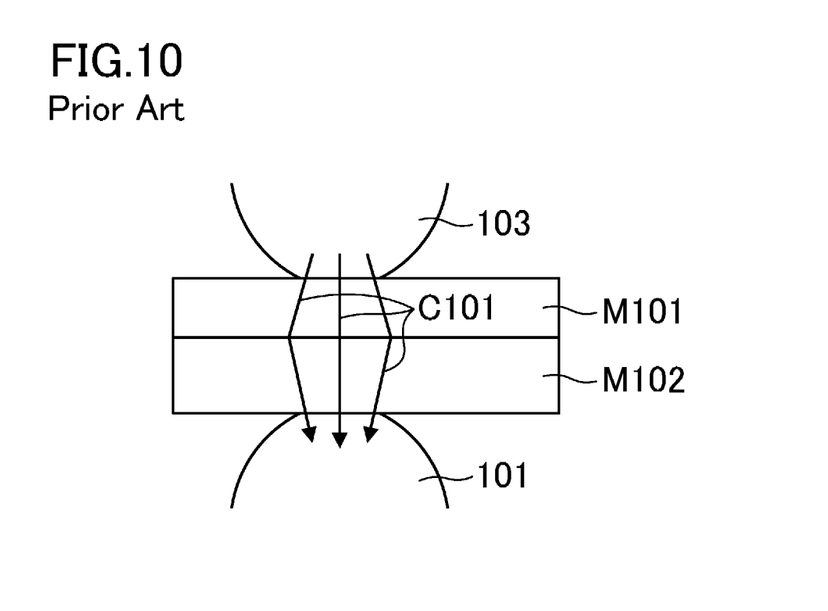
FIG. 10 is a view illustrating the principle of known direct spot welding.
Figure 11:
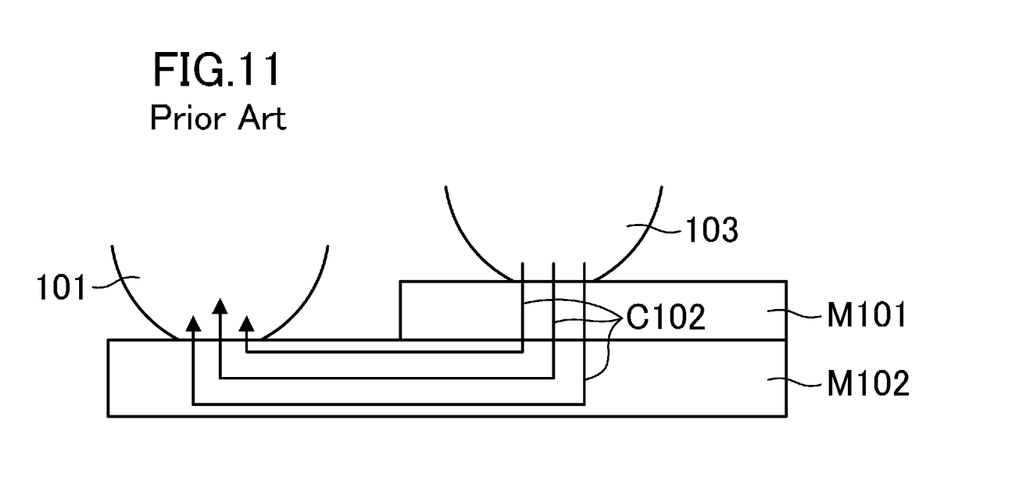
FIG. 11 is a view illustrating the principle of known indirect spot welding

Conventionally, for example, direct spot welding illustrated in FIG. 10 in which, in a state in which a welding electrode 103 and a ground electrode 101 are coaxially disposed so as to be opposed to each other and welding positions of welding target members M101 and M102 are held by the electrodes 101 and 103 therebetween, energization is performed as indicated by the reference symbol C101 and welding is performed has been known. However, when another member is disposed in one side of the welding target members, when a space is constrained, or the like, indirect spot welding is performed. Indirect spot welding is, for example, a method illustrated in FIG. 11 in which, in a state in which positions of the welding electrode 103 and the ground electrode 101 are shifted from each other, the welding electrode 103 and the ground electrode 101 are brought into pressure contact with the welding target members M101 and M102 to perform energization as indicated by the reference symbol C102 and welding is performed.

For example, Japanese Patent Application No. 2016-59937 describes a technology in which, in indirect spot welding, a holding member that holds a plate-shaped member that is an object to be welded with a ground electrode therebetween is provided to ensure sufficient contact of the ground electrode and the plate-shaped member. Thus, welding and electro-corrosion of a portion around a contact area of the ground electrode and the plate-shaped member can be suppressed.

SUMMARY

Incidentally, in the technology described in Japanese Patent Application No. 2016-59937, as illustrated in FIG. 1 of Japanese Patent Application No. 2016-59937, the ground electrode and the holding member are an integrated C-shaped member, and a welding electrode is formed as a separate member from the C-shaped member. Thus, an inter-electrode distance between the ground electrode and the welding electrode is increased, and therefore, a problem in which a size of an apparatus is increased, so that welding work in a narrow space is difficult or a problem in which a reactive current during welding is increased and it is difficult to increase efficiency of welding work arises.

Therefore, it is an object of the present disclosure to provide an indirect spot welding apparatus and a welding method that can contribute to reduction in size of the apparatus and can increase efficiency of welding work.

In order to solve the above described problems, according to the present disclosure, a welding electrode is integrated with a ground electrode.

That is, an indirect spot welding apparatus according to a first technology disclosed herein includes a welding electrode that is brought into pressure contact with one of surfaces of a plurality of plate-shaped members that are objects to be welded in one side in a stacking direction of the plurality of plate-shaped members, a ground electrode that is brought into pressure contact with the one of the surfaces of the plurality of plate-shaped members in the one side in the stacking direction or another one of the surfaces in the other side in the stacking direction in a position shifted from an axial center of the welding electrode, and an opposed member disposed coaxially with the ground electrode to be opposed to the ground electrode so as to hold at least one of the plurality of plate-shaped members between the opposed member and the ground electrode, and the welding electrode is mechanically integrated with the ground electrode so as to be movable in a direction parallel to an axial direction of the ground electrode.

According to this technology, the welding electrode is mechanically integrated with the ground electrode, and therefore, an inter-electrode distance between the welding electrode and the ground electrode can be shortened. Thus, an electrical path can be shortened, a reactive current during welding can be reduced to efficiently generate heat, and therefore, an energization time needed for welding can be shortened and efficiency of welding work can be increased. Also, welding work can be performed in a narrow welding position in which a work space is limited. Note that, as used herein, the term "mechanically integrated" includes, for example, a case in which components formed as separate bodies are mechanically fixed to each other via a fixing tool or the like.

According to a second technology, in the first technology, the ground electrode and the opposed member are mechanically integrated.

According to this technology, it is easy to hold the plurality of plate-shaped members with the ground electrode and the opposed member. The ground electrode, the opposed member, and the welding electrode are mechanically integrated to each other, and therefore, this technology can contribute to making the apparatus compact.

According to a third technology, in the first technology, the ground electrode is configured to be movable in the stacking direction of the plurality of plate-shaped members by a ground electrode driving section provided in the ground electrode, and the welding electrode is configured to be movable in the stacking direction of the plurality of plate-shaped members independently from movement of the ground electrode by a welding electrode driving section provided in the welding electrode.

According to this technology, the ground electrode and the welding electrode are movable independently from each other, and therefore, a relative position of the welding electrode with respect to the ground electrode can be maintained with high accuracy. In other words, a pressurization mechanism of the welding electrode and a pressurization mechanism of the ground electrode are independent from each other, and therefore, a welding pressure needed for preferably achieving welding quality can be set for each pressurization mechanism. Accordingly, the ground electrode is brought into contact with the objects to be welded with a high welding pressure to ensure holding the objects to be welded by the ground electrode and the opposed member, and also, the welding electrode can be brought into contact with the objects to be welded with a low welding pressure. Thus, pressure contact of the welding electrode and deformation of the objects to be welded caused by heat generation can be reduced, excessive welding of the welding position caused by energization or the like can be reduced, and therefore, excellent welding quality can be achieved with high reproducibility. Moreover, simplification of welding steps and cost reduction can be achieved.

According to a fourth technology, in the second technology, the ground electrode is configured to be movable in the stacking direction of the plurality of plate-shaped members by a ground electrode driving section provided in the ground electrode, and the welding electrode is configured to be movable in the stacking direction of the plurality of plate-shaped members independently from movement of the ground electrode by a welding electrode driving section provided in the welding electrode.

According to this technology, the ground electrode and the welding electrode are movable independently from each other, and therefore, the relative position of the welding electrode with respect to the ground electrode can be maintained with high accuracy. In other words, the pressurization mechanism of the welding electrode and the pressurization mechanism of the ground electrode are independent from each other, and therefore, the welding pressure needed for preferably achieving welding quality can be set for each pressurization mechanism. Accordingly, the ground electrode is brought into contact with the objects to be welded with a high welding pressure to ensure holding the objects to be welded by the ground electrode and the opposed member, and also, the welding electrode can be brought into contact with the objects to be welded with a low welding pressure. Thus, pressure contact of the welding electrode and deformation of the objects to be welded caused by heat generation can be reduced, excessive welding of the welding position caused by energization or the like can be reduced, and therefore, excellent welding quality can be achieved with high reproducibility. Moreover, simplification of welding steps and cost reduction can be achieved.

According to a fifth technology, in the first technology, the indirect spot welding apparatus further includes a power supply device connected to the welding electrode and the ground electrode, and the opposed member is insulated from the power supply device.

According to this technology, the electrical path is limited to between two electrodes, that is, the welding electrode and the ground electrode, and thereby, efficient welding is enabled.

According to a sixth technology, in the second technology, the indirect spot welding apparatus further includes a power supply device connected to the welding electrode and the ground electrode, and the opposed member is insulated from the power supply device.

According to this technology, the electrical path is limited to between two electrodes, that is, the welding electrode and the ground electrode, and thereby, efficient welding is enabled.

According to a seventh technology, in the third technology, the indirect spot welding apparatus further includes a power supply device connected to the welding electrode and the ground electrode, and the opposed member is insulated from the power supply device.

According to this technology, the electrical path is limited to between two electrodes, that is, the welding electrode and the ground electrode, and thereby, efficient welding is enabled.

According to an eighth technology, in the fourth technology, the indirect spot welding apparatus further includes a power supply device connected to the welding electrode and the ground electrode, and the opposed member is insulated from the power supply device.

According to this technology, the electrical path is limited to between two electrodes, that is, the welding electrode and the ground electrode, and thereby, efficient welding is enabled.

According to a ninth technology, in the first technology, the plurality of plate-shaped members contact with each other via a contact portion formed in a welding position.

According to this technology, the indirect spot welding apparatus is configured such that the plurality of plate-shaped members contact with each other via the contact portion formed in a desired welding position, and thereby, the electrical path is limited to within the contact portion during energization. Thus, the contact portion is melted by energization, and thereby, in the contact portion, a starting point of welding is formed, and efficient and rapid welding is enabled.

According to a tenth technology, in the second technology, the plurality of plate-shaped members contact with each other via a contact portion formed in a welding position.

According to this technology, the indirect spot welding apparatus is configured such that the plurality of plate-shaped members contact with each other via the contact portion formed in a desired welding position, and thereby, the electrical path is limited to within the contact portion during energization. Thus, the contact portion is melted by energization, and thereby, in the contact portion, a starting point of welding is formed, and efficient and rapid welding is enabled.

According to an eleventh technology, in the third technology, the plurality of plate-shaped members contact with each other via a contact portion formed in a welding position.

According to this technology, the indirect spot welding apparatus is configured such that the plurality of plate-shaped members contact with each other via the contact portion formed in a desired welding position, and thereby, the electrical path is limited to within the contact portion during energization. Thus, the contact portion is melted by energization, and thereby, in the contact portion, a starting point of welding is formed, and efficient and rapid welding is enabled.

According to a twelfth technology, in the fourth technology, the plurality of plate-shaped members contact with each other via a contact portion formed in a welding position.

According to this technology, the indirect spot welding apparatus is configured such that the plurality of plate-shaped members contact with each other via the contact portion formed in a desired welding position, and thereby, the electrical path is limited to within the contact portion during energization. Thus, the contact portion is melted by energization, and thereby, in the contact portion, a starting point of welding is formed, and efficient and rapid welding is enabled.

According to a thirteenth technology, in the fifth technology, the plurality of plate-shaped members contact with each other via a contact portion formed in a welding position.

According to this technology, the indirect spot welding apparatus is configured such that the plurality of plate-shaped members contact with each other via the contact portion formed in a desired welding position, and thereby, the electrical path is limited to within the contact portion during energization. Thus, the contact portion is melted by energization, and thereby, in the contact portion, a starting point of welding is formed, and efficient and rapid welding is enabled.

According to a fourteenth technology, in the ninth technology, the plurality of plate-shaped members are two plate-shaped members, and the contact portion is a raised portion formed in one of surfaces of the two plate-shaped members, which are disposed to be opposed to each other, so as to have a raised shape toward the other one of the surfaces.

According to this technology, the raised portion formed in the plate-shaped member serves as the contact portion, and thereby, the electrical path can be limited with a simple configuration and welding can be efficiently performed.

An indirect spot welding method according to a fifteenth technology disclosed herein includes a holding step of causing a ground electrode and an opposed member disposed coaxially with the ground electrode to be opposed to the ground electrode to hold at least one of a plurality of plate-shaped members that are objects to be welded between the ground electrode and the opposed member, and a pressure contact step of bringing a welding electrode into pressure contact with one of surfaces of the plurality of plate-shaped members in one side in a stacking direction of the plurality of plate-shaped members or another one of the surfaces in the other side in the stacking direction in a position shifted from an axial center of the ground electrode, and the welding electrode is mechanically integrated with the ground electrode so as to be movable in a direction parallel to an axial direction of the ground electrode, and an inter-electrode distance between the welding electrode and the ground electrode is 30 mm or more and 150 mm or less.

According to this technology, the welding electrode and the ground electrode are mechanically integrated, and therefore, the inter-electrode distance between the welding electrode and the ground electrode can be shortened to be in a predetermined range. Thus, an electrical path can be shortened, a reactive current during welding can be reduced to efficiently generate heat, and therefore, an energization time needed for welding can be shortened and efficiency of welding work can be increased. Also, welding work can be performed in a narrow welding position in which a work space is limited.

According to a sixteenth technology, in the fifteenth technology, a welding pressure of the welding electrode is smaller than a welding pressure of the ground electrode.

According to this technology, the ground electrode can be brought into contact with the objects to be welded with a high welding pressure to ensure holding of the objects to be welded by the ground electrode and the opposed member, and also, the welding electrode can be brought into contact with the objects to be welded with a low welding pressure. Thus, pressure contact of the welding electrode and deformation of the objects to be welded caused by heat generation can be reduced, excessive welding of the welding position caused by energization or the like can be reduced, and therefore, excellent welding quality can be achieved with high reproducibility.

According to a seventeenth technology, in the fifteenth technology, the plurality of plate-shaped members contact with each other via a contact portion formed in a welding position.

According to this technology, the indirect spot welding method is configured such that the plurality of plate-shaped members contact with each other via the contact portion formed in a desired welding position, and thereby, the electrical path is limited to within the contact portion during energization. Thus, the contact portion is melted by energization, and thereby, in the contact portion, a starting point of welding is formed, and efficient and rapid welding is enabled.

According to an eighteenth technology, in the sixteenth technology, the plurality of plate-shaped members contact with each other via a contact portion formed in a welding position.

According to this technology, the indirect spot welding method is configured such that the plurality of plate-shaped members contact with each other via the contact portion formed in a desired welding position, and thereby, the electrical path is limited to within the contact portion during energization. Thus, the contact portion is melted by energization, and thereby, in the contact portion, a starting point of welding is formed, and efficient and rapid welding is enabled.

According to a nineteenth technology, in the seventeenth technology, the plurality of plate-shaped members are two plate-shaped members, and the contact portion is a raised portion formed in one of surfaces of the two plate-shaped members, which are disposed to be opposed to each other, so as to have a raised shape toward the other one of the surfaces.

According to this technology, the raised portion formed in the plate-shaped member serves as the contact portion, and thereby, the electrical path can be limited with a simple configuration and welding can be efficiently performed.

An indirect spot welding apparatus according to a twentieth technology disclosed herein includes a welding electrode that is brought into pressure contact with one of surfaces of a plurality of plate-shaped members that are objects to be welded in one side in a stacking direction of the plurality of plate-shaped member, a ground electrode that is brought into pressure contact with the one of the surfaces of the plurality of plate-shaped members in the one side in the stacking direction in a position shifted from an axial center of the welding electrode, and an opposed member disposed coaxially with the ground electrode to be opposed to the ground electrode so as to hold at least one of the plurality of plate-shaped members between the opposed member and the ground electrode, the ground electrode and the opposed member are mechanically integrated by a C-shaped gun, the C-shaped gun includes a ground electrode gun connected to the ground electrode, the welding electrode is connected to the ground electrode gun of the C-shaped gun via a contact portion, and the welding electrode is movable in a direction parallel to an axial direction of the ground electrode.

According to this technology, the welding electrode is connected to the ground electrode gun of the C-shaped gun via the contact portion, and thereby, the welding electrode and the ground electrode are mechanically integrated. Thus, an inter-electrode distance between the welding electrode and the ground electrode can be shortened. In the above described manner, an electrical path can be shortened, a reactive current during welding can be reduced to efficiently generate heat. An energization time needed for welding can be shortened and efficiency of welding work can be increased. Also, welding work can be performed in a narrow welding position in which a work space is limited.

As described above, according to the present disclosure, the welding electrode is mechanically integrated with ground electrode, and therefore, an inter-electrode distance between the welding electrode and the ground electrode can be shortened. Thus, an electrical path can be shortened, a reactive current during welding can be reduced to efficiently generate heat, and therefore, an energization time needed for welding can be shortened and efficiency of welding work

DETAILED DESCRIPTION

Embodiments of the present disclosure will now be described in detail with reference to the drawings. The following description of the embodiments are mere examples by nature, and are not intended to limit the scope, application, or uses of the present disclosure.

First Embodiment

<Indirect Spot Welding Apparatus>

As illustrated in FIG. 1 to FIG. 4, an indirect spot welding apparatus 1 according to a first embodiment includes a ground electrode 11, an opposed member 12, and a welding electrode 13. Two plate-shaped members M1, M2 (a plurality of plate-shaped members) as objects to be welded and an additional member M3 (the plurality of plate-shaped members) are disposed between the ground electrode 11 and the welding electrode 13, and the opposed member 12. In this embodiment, the welding electrode 13 is brought into pressure contact with the plate-shaped member M1, and the ground electrode 11 is brought into pressure contact with the plate-shaped member M2. The plate-shaped member M2 and the additional plate M3 are held between the ground electrode 11 and the opposed member 12. Note that the objects to be welded may include two or more plate-shaped members M1, M2, and the objects to be welded do not include the additional plate M3 in some cases.

Figure 1:
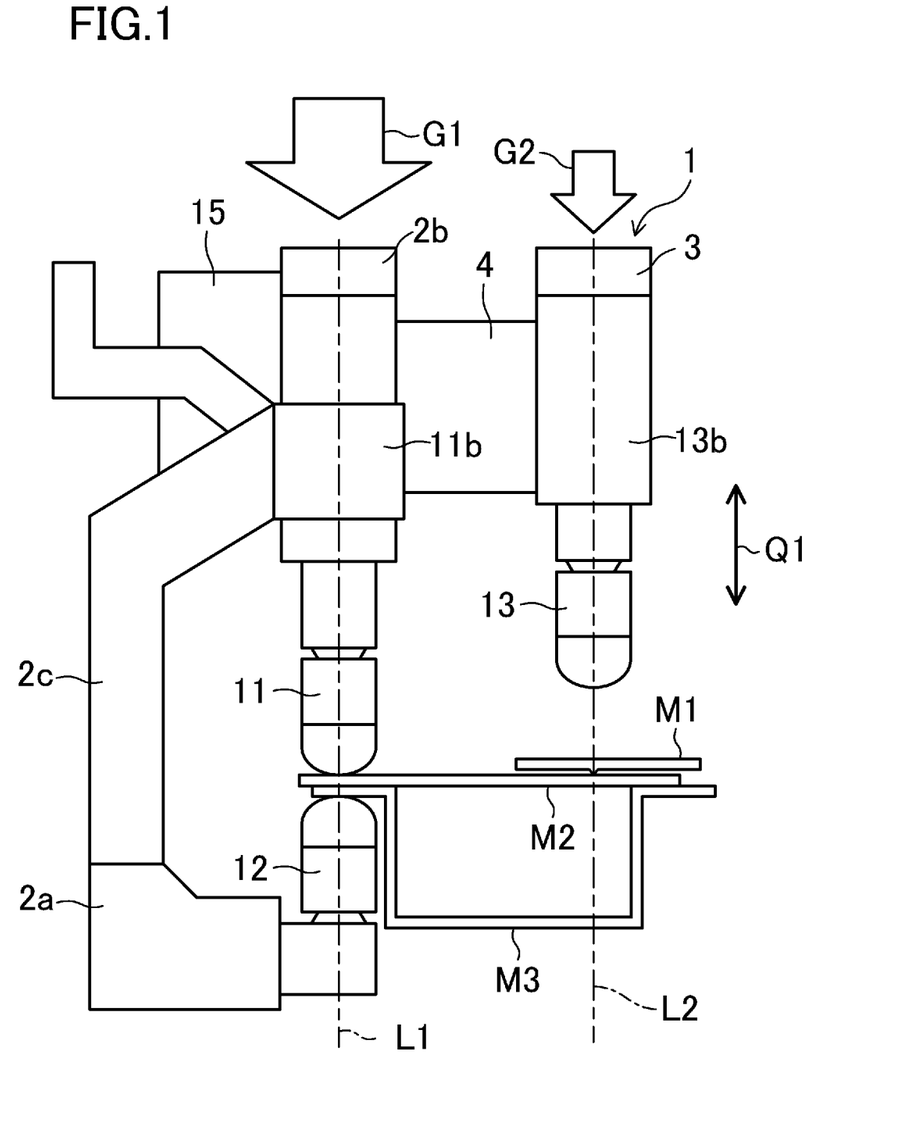
FIG. 1 is a view schematically illustrating an indirect spot welding apparatus according to a first embodiment.
Figure 2:
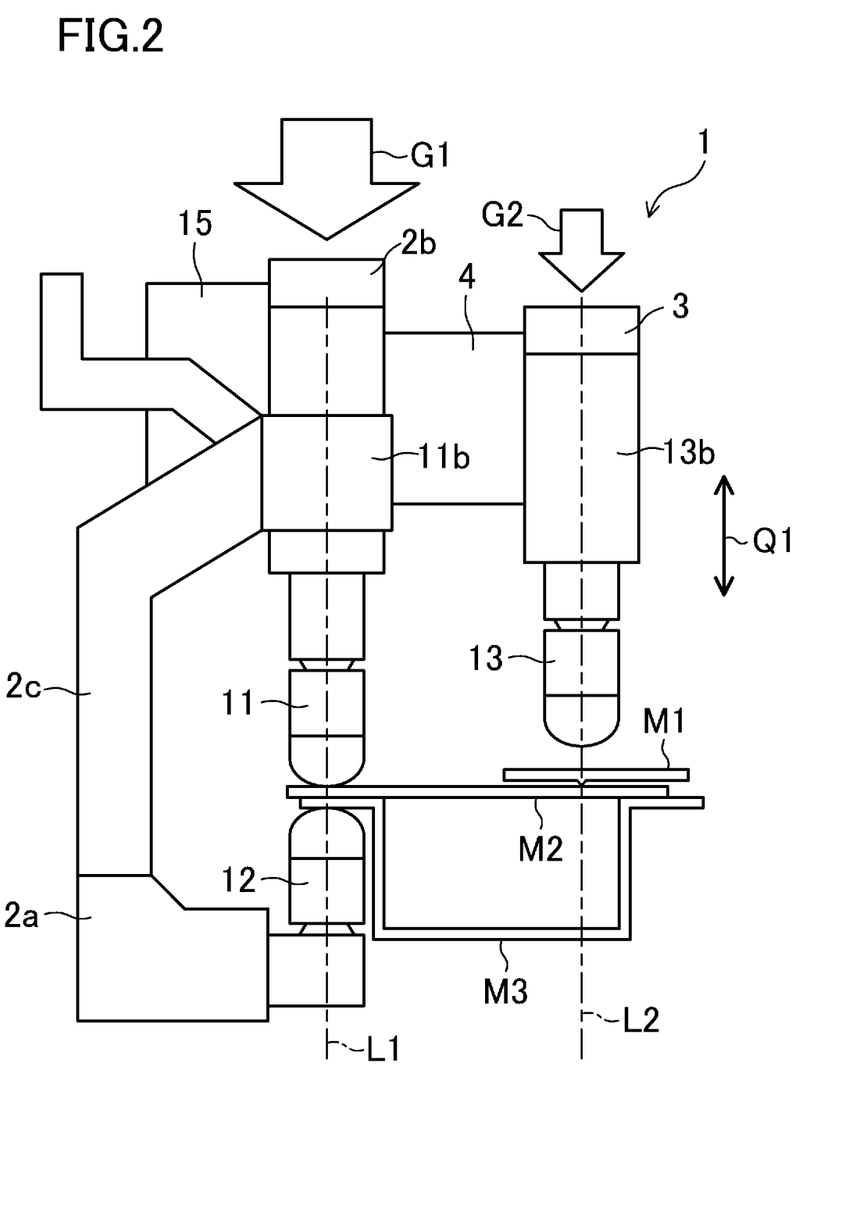
FIG. 2 is a view illustrating a state in which a welding electrode is set close to a plate-shaped member in the indirect spot welding apparatus.
Figure 4:
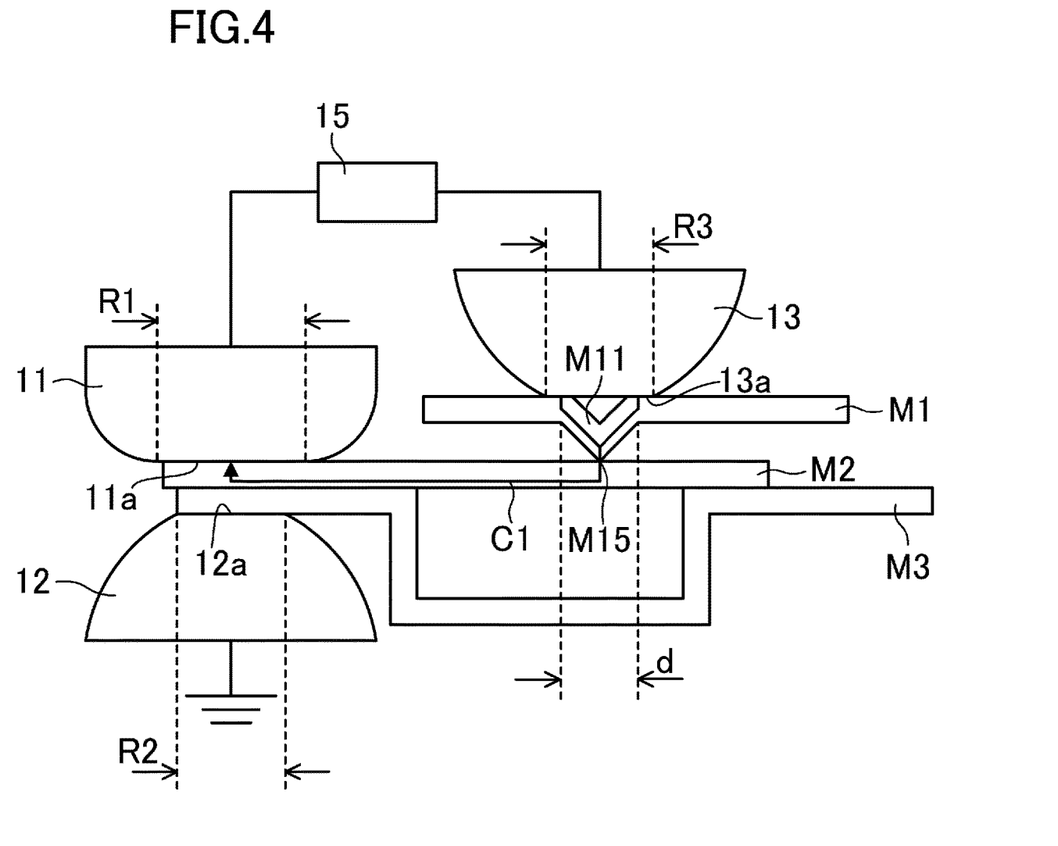
FIG. 4 is a view schematically illustrating a portion near plate-shaped members during energization in the indirect spot welding apparatus of FIG. 1.

Note that, as illustrated in FIG. 1, FIG. 2, and FIG. 4, the indirect spot welding apparatus 1 includes a power supply device 15 electrically connected to the welding electrode 13 and the ground electrode 11. The power supply device 15 includes, for example, an electrical circuit that connects the welding electrode 13 and the ground electrode 11, an AC power source connected to the electrical circuit, a transformer, a control section that controls the amount of a current that flows between both of the electrodes, or the like. Note that a physical arrangement of the power supply device 15 is not limited to those of FIG. 1 and FIG. 2 and may be changed as appropriate in accordance with the configuration of the indirect spot welding apparatus 1.

An electrical path C1 that extends from a welding electrode end surface 13a of the welding electrode 13 and passes through the plate-shaped member M1, a contact point M15 of the plate-shaped members M1, M2, and the plate-shaped member M2 to reach a ground electrode end surface 11a of the ground electrode 11 is formed by causing a current to pass between the welding electrode 13 and the ground electrode 11 by the power supply device 15. Thus, a nugget is formed in the contact point M15, and the plate-shaped members M1, M2 are welded.

—Plate-Shaped Member—

The plate-shaped members M1, M2 are two or more plate-shaped members that can be joined to each other by spot welding. As the plate-shaped members M1, M2, any metal plate-shaped members that can be energized and be generally sport-welded can be used, and the plate-shaped members M1, M2 are, for example, iron, steel, aluminum, an alloy of iron, steel, or aluminum, or the like, or a metal plate-shaped member having a plated surface. Specifically, the plate-shaped members M1, M2 are, for example, vehicle parts, such as a front panel, a floor panel, a rear panel, a side sill, a tunnel reinforcement, a cross member, a frame, an outer panel, or the like, which can be joined to each other, or the like.

Figure 3:
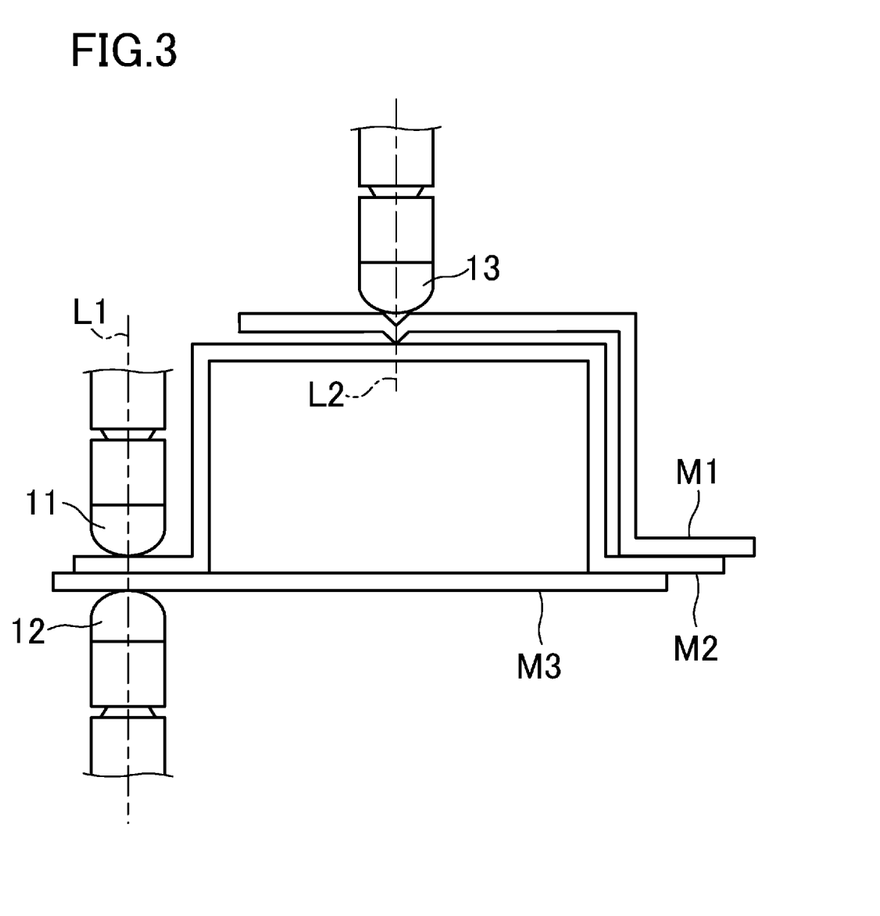
FIG. 3 is a view illustrating an example of objects to be welded.

Note that, in particular, as illustrated in FIG. 1 to FIG. 4, the objects to be welded include the additional plate M3 (the plurality of plate-shaped members) or the like in an opposed side to a side of the plate-shaped member M2 in which the plate-shaped member M1 is disposed in some cases. Specifically, for example, the objects to be welded are three or more members, that is, the plate-shaped member M1 serving as an outer panel, the plate-shaped member M2 serving as a reinforced panel, and the additional plate M3 serving as an inner panel, which overlap each other, or the like. As for the objects to be welded that are three or more overlapping members, for example, as illustrated in FIG. 1 or the like, the additional plate M3 is, for example, a member having a hat-shaped cross section, a bulky member, or the like in some cases and, for example, as illustrated in FIG. 3, the plate-shaped member M2 is, for example, a member having a hat-shaped cross section, a bulky member, or the like in other cases. In an area described above, the additional plate M3 is an obstacle and it is difficult to join the plate-shaped members M1, M2 to each other in general direct spot welding. Accordingly, in the objects to be welded that are three or more overlapping members, it is preferable to perform welding by indirect spot welding according to this embodiment. Note that, for example, the plate-shaped member M1 and the plate-shaped member M2, or the plate-shaped member M2 and the additional plate M3 may be joined to each other or may not be joined to each other, for example, by various types of welding methods including spot welding, an adhesive, a rivet, or the like in a position spaced apart from a welding position in which the welding is performed by an indirect spot welding method according to this embodiment.

A thickness of the plate-shaped member M1 is, for example, 0.5 mm or more and 1 mm or less, although the thickness is determined depending on a material of the plate-shaped member M1. A thickness of the plate-shaped member M2 is, for example, 1 mm or more and 3 mm or less, although the thickness is determined depending on a material of the plate-shaped member M2. A shape, a size, or the like of the additional plate M3 are not particularly limited and are determined as appropriate.

—Raised Portion—

As illustrated in FIG. 4, a raised portion M11 (a contact portion) is formed in a welding position in a side of the plate-shaped member M1, which is opposed to the plate-shaped member M2, in view of promoting forming a nugget during energization, as will be described later. In other words, the raised portion M11 is formed in a surface of the plate-shaped member M1 that is one of surfaces of the plate-shaped members M1, M2, which are disposed to be opposed to each other, so as to be raised toward a surface of the plate-shaped member M2 that is the other one of the surfaces of the plate-shaped members M1, M2, which are opposed to each other. The plate-shaped members M1, M2 contact each other via the contact point M15 of the raised portion M11. The contact point M15 is a welding position.

According to this configuration, the plate-shaped members M1, M2 contact each other via the raised portion M11 formed in a desired welding portion of each of the plate-shaped members M1, M2, and thereby, the electrical path is limited to within the raised portion M11 during energization. Thus, the raised portion M11 is melt by energization, and thereby, in the raised portion M11, formation of a nugget that is a starting point of welding is promoted, so that efficient and rapid welding can be performed. In this configuration, the raised portion M11 is merely formed in the welding position of the plate-shaped member M1, and therefore, the electrical path can be limited with a simple configuration, so that welding can be efficiently performed.

A size of the raised portion M11 is not particularly limited but, in view of promoting forming a nugget and reducing a welding time, as illustrated in FIG. 3, for example, a largest diameter d of the raised portion M11 can be set to 1 mm or more and 5 mm or less. Note that, although, in FIG. 1 to FIG. 4, the plate-shaped members M1, M2 are illustrated such that the plate-shaped members M1, M2 contact each other only in the contact point M15 of the raised portion M11, FIG. 1 to FIG. 4 are merely schematic illustrations and the plate-shaped members M1, M2 may be brought into contact each other in a portion other than the contact point M15 in the opposed surfaces of the plate-shaped members M1, M2.

A method for forming the raised portion M11 is not particularly limited and the raised portion M11 can be formed by press molding, punching, or the like. The raised portion M11 is formed in the plate-shaped member M1 but may be formed in the plate-shaped member M2.

—Ground Electrode and Opposed Member—

The ground electrode 11 is an electrode used for performing energization between the ground electrode 11 and the welding electrode 13. The opposed member 12 is a member that holds at least one of the plate-shaped members M1, M2 with the ground electrode 11 therebetween. In this embodiment, as illustrated in FIG. 1 to FIG. 4, the plate-shaped member M2 and the additional plate M3 are held between the ground electrode 11 and the opposed member 12.

As illustrated in FIG. 1, the ground electrode 11 is disposed in one of surfaces of the plate-shaped members M1, M2 in one side in a stacking direction Q1, that is, in a side of the plate-shaped member M2 in which the plate-shaped member M1 is disposed.

As illustrated in FIG. 1 and FIG. 2, the indirect spot welding apparatus 1 includes a base 2a on which the substantially columnar opposed member 12 is provided, a support portion 2c connected to the base 2a, a ground electrode driving section 2b provided in an end of the support portion 2c, a substantially columnar ground electrode gun 11b connected to an end of the ground electrode driving section 2b, and the substantially columnar ground electrode 11 provided in an end portion of the ground electrode gun 11b. In other words, the ground electrode 11 and the opposed member 12 are mechanically integrated by a C-shaped gun formed of the base 2a, the support portion 2c, the ground electrode driving section 2b, and the ground electrode gun 11b. A central axis of each of the ground electrode gun 11b and the ground electrode 11 is an axial center L1. The opposed member 12 is disposed coaxially with the ground electrode 11 about the axial center L1 to be opposed to the ground electrode 11. Note that an axial center L1 direction is parallel to the stacking direction Q1 of the plate-shaped members M1, M2. The ground electrode driving section 2b is not particularly limited and, for example, a driving mechanism using an air cylinder, a ball screw mechanism using motor driving, a robot arm, or the like can be employed.

The ground electrode gun 11b moves in the stacking direction Q1 of the plate-shaped members M1, M2, that is, in the axial center L1 direction, as indicated by an arrow G1 in each of FIG. 1 and FIG. 2, in accordance with an operation of the ground electrode driving section 2b. The ground electrode 11 is configured to be movable in the axial center L1 in accordance with movement of the ground electrode gun 11b. The ground electrode 11 is lowered from an upper side to a lower side as indicated by an arrow G1 in each of FIG. 1 and FIG. 2 in accordance with an operation of the ground electrode driving section 2b and is brought into pressure contact with a surface of the plate-shaped member M2. Thus, the plate-shaped member M2 and the additional plate M3 are held between the ground electrode 11 and the opposed member 12.

As illustrated in FIG. 4, the ground electrode 11 is brought into pressure contact with the plate-shaped member M2 in the ground electrode end surface 11a. Note that a shape of the ground electrode end surface 11a is a circle a center of which is the axial center L1 (see FIG. 7) but is not limited to the above described shape as long as a sufficient energization amount can be ensured. The shape of the ground electrode end surface 11a may be a shape, such as, for example, an ellipse, a rectangle, or the like, a center of which is the axial center L1. A maximum diameter R1 of the ground electrode end surface 11a can be set to, for example, 5 mm or more and 16 mm or less in view of ensuring a sufficient energization amount.

The opposed member 12 contacts the additional plate M3 in an opposed member end surface 12a. A shape of the opposed member end surface 12a is not particularly limited and the opposed member end surface 12a can be made into a shape, such as a circle, an ellipse, a rectangle, or the like, a center of which is the same as a center of the ground electrode end surface 11a, in view of reliably holding the plate-shaped member M2 and the additional plate M3 between the opposed member 12 and the ground electrode 11. The maximum diameter R2 of the opposed member end surface 12a can be set to, for example, 3 mm or more and 8 mm or less in view of reliably holding the plate-shaped member M2 and the additional plate M3 between the opposed member 12 and the ground electrode 11. Note that the maximum diameter R2 of the opposed member end surface 12a is preferably smaller than a maximum diameter R1 of the ground electrode end surface 11a. Thus, slip that occurs when the plate-shaped member M2 and the additional plate M3 are held by the ground electrode end surface 11a and the opposed member end surface 12a can be reduced.

Note that the opposed member 12 is insulated from the power supply device 15 to which the welding electrode 13 and the ground electrode 11 are connected. Specifically, the opposed member 12 and/or the base 2a to which the opposed member 12 is connected are/is formed of or is covered by an insulation material, such as a rubber material, bakelite, or the like. Thus, the electrical path during energization can be limited to between two electrodes, that is, the welding electrode 13 and the ground electrode 11, and efficient welding is possible.

A welding pressure of the ground electrode 11 can be set to, for example, 1.5 kN or more and 6 kN or less in view of ensuring sufficient contact with the plate-shaped member M2 and reliably holding the plate-shaped member M2 and the additional plate M3 between the ground electrode 11 and the opposed member 12.

—Welding Electrode—

The welding electrode 13 is an electrode used for performing energization between the welding electrode 13 and the ground electrode 11 and performing welding in a welding position. The welding electrode 13 is brought into pressure contact with one of surfaces of the plate-shaped members M1, M2 in one side in the stacking direction Q1 of the plate-shaped members M1, M2, that is, a surface of the plate-shaped member M1 on which the plate-shaped member M2 is not disposed.

The indirect spot welding apparatus 1 according to this embodiment is configured such that the welding electrode 13 is integrated with the ground electrode 11.

Specifically, a substantially columnar welding electrode gun 13b is attached to the ground electrode gun 11b via a connection portion 4. The substantially columnar welding electrode 13 is provided in an end of the welding electrode gun 13b. Note that a central axis of each of the welding electrode 13 and the welding electrode gun 13b is an axial center L2. The axial center L2 is parallel to the axial center L1 of the ground electrode 11 and the ground electrode gun 11b and is located in a position off the axial center L1. In other words, the ground electrode 11 is disposed in a position off the axial center L2 of the welding electrode 13.

A welding electrode driving section 3 is provided in an opposite side to a side of the welding electrode 13b in which the welding electrode gun 13 is disposed. The welding electrode gun 13b is driven by the welding electrode driving section 3 to move up and down independently from movement of the ground electrode gun 11b in the axial center L2, as indicated by an arrow G2 in each of FIG. 1 and FIG. 2. That is, the welding electrode 13 is configured to be movable independently from movement of the ground electrode 11 in the axial center L2 direction which is parallel to the axial center L1 of the ground electrode 11. By forming this configuration, the welding electrode 13 is mechanically integrated with the ground electrode 11, and therefore, a relative position of the welding electrode 13 with respect to the ground electrode 11 in the axial center L2 direction can be maintained with high accuracy. Thus, the welding pressure of the welding electrode 13 can be controlled with high accuracy. Note that the welding electrode 13 can be pressurized independently from the ground electrode 11, and therefore, the welding electrode 13 can be accurately brought into pressure contact with the plate-shaped member M1 with a lower welding pressure than a welding pressure applied to the ground electrode 11. In the above described manner, excellent welding quality can be achieved with good reproducibility by stably controlling a contact resistance of the welding electrode 13 while reducing deformation of the plate-shaped members M1, M2. Note that, as the welding electrode driving section 3, for example, a driving mechanism using an air cylinder, a ball screw mechanism using motor driving, or the like can be employed.

An inter-electrode distance between with ground electrode 11 and the welding electrode 13 can be shortened by mechanically integrating the welding electrode gun 13b with the ground electrode gun 11b. Specifically, a distance between a center of the ground electrode gun 11b and a center of the welding electrode end surface 13a, that is, a shortest distance between the axial center L1 and the axial center L2, can be set to, for example, 30 mm or more and 150 mm or less in view of shortening the electrical path to reduce the energization amount and a welding time and thereby enabling efficient welding. By forming this configuration, the electrical path C1 can be shortened and an energization time needed for welding can be shortened. Thus, deformation of the plate-shaped members M1, M2 and the additional plate M3 caused by pressure contact of the welding electrode 13, the ground electrode 11, and the opposed member 12 can be reduced, and excessive welding in the welding position caused by energization or the like can be reduced. Moreover, cost reduction and simplification of welding steps can be achieved.

As illustrated in FIG. 4, the welding electrode 13 is brought into pressure contact with the plate-shaped member M1 in the welding electrode end surface 13a. A shape of the welding electrode end surface 13a is a circle a center of which is the axial center L2 (see FIG. 7) but, as long as a sufficient energization amount can be ensured, the shape of the welding electrode end surface 13a is not limited to the above described shape and may be a shape, such as, for example, an ellipse, a rectangle, or the like, a center of which is the axial center L2. A maximum diameter R3 of the welding electrode end surface 13a can be set to, for example, 3 mm or more and 16 mm or less in view of ensuring a sufficient energization amount and limiting the electrical path.

The welding pressure of the welding electrode 13 can be set to, for example, 0.4 kN or more and 2.0 kN or less in view of ensuring sufficient contact with the plate-shaped member M1 and also reducing damage of the plate-shaped member M1. Note that the welding pressure of the welding electrode 13 is preferably smaller than the welding pressure of the ground electrode 11. In this configuration, while the ground electrode 11 is brought into contact with the objects to be welded with a high welding pressure to ensure holding of the objects to be welded by the ground electrode 11 and the opposed member 12, the welding electrode 13 can be brought into contact with the objects to be welded with a low welding pressure. Thus, deformation of the objects to be welded caused by pressure contact of the welding electrode 13 and heat generation can be reduced and excessive welding in the welding position caused by energization or the like can be reduced, so that excellent welding quality can be achieved with good reproducibility.

<Indirect Spot Welding Method>

Figure 5:
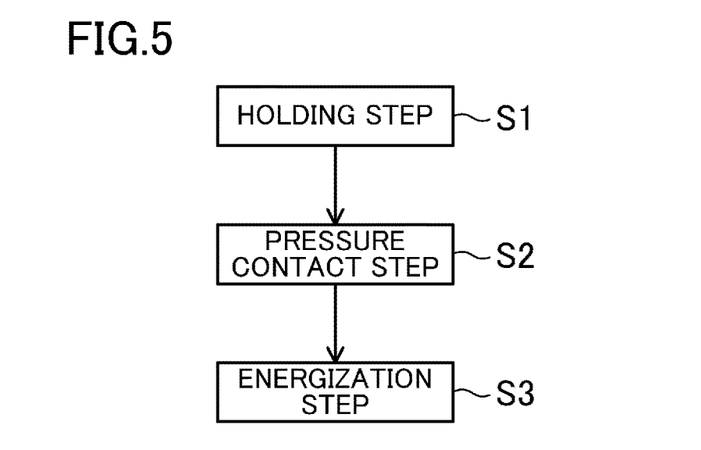
FIG. 5 is a flowchart illustrating steps of an indirect spot welding method according to the first embodiment.

As illustrated in FIG. 5, an indirect spot welding method according to this embodiment includes a holding step S1, a pressure contact step S2, and an energization step S3.

—Holding Step—

First, in the holding step S1, at least one of objects to be welded including the plate-shaped members M1, M2 and the additional plate M3 is held by the ground electrode 11 and the opposed member 12.

Specifically, in a state in which the ground electrode 11 and the opposed member 12 are sufficiently separated from each other, at least one of the objects to be welded including the plate-shaped members M1, M2 and the additional plate M is placed on the opposed member end surface 12a of the opposed member 12. Then, the ground electrode 11 is lowered from an upper side in the axial center L1 direction by an operation of the ground electrode driving section 2b and the ground electrode end surface 11a is brought into pressure contact with the at least one of the objects to be welded, and thus, at least one of the objects to be welded is held by the ground electrode 11 and the opposed member 12. In the above described manner, the ground electrode 11 is brought into pressure contact with a surface of the plate-shaped member M2 in a side in which the plate-shaped member M1 is disposed in a position shifted from the axial center L2 of the welding electrode 13.

—Pressure Contact Step—

Next, in the pressure contact step S2, the welding electrode driving section 3 is driven to lower the welding electrode 13 from the upper side, and thus, the welding electrode 13 is brought into pressure contact in a side of the plate-shaped member M1 in which the plate-shaped member M2 is not disposed. In this step, the welding electrode 13 can be brought into pressure contact with the plate-shaped member M1 of the objects to be welded with a low welding pressure by causing the welding electrode 13 move in a direction parallel to the axial center L1 of the ground electrode 11, that is, in the axial center L2 direction, and adjusting the welding pressure of the welding electrode 13.

—Energization Step—

In a state in which the welding electrode 13 is in pressure contact with the plate-shaped member M1, a voltage is applied between the welding electrode 13 and the ground electrode 11 to energize between the welding electrode 13 and the ground electrode 11 by the power supply device 15.

Figure 6A:
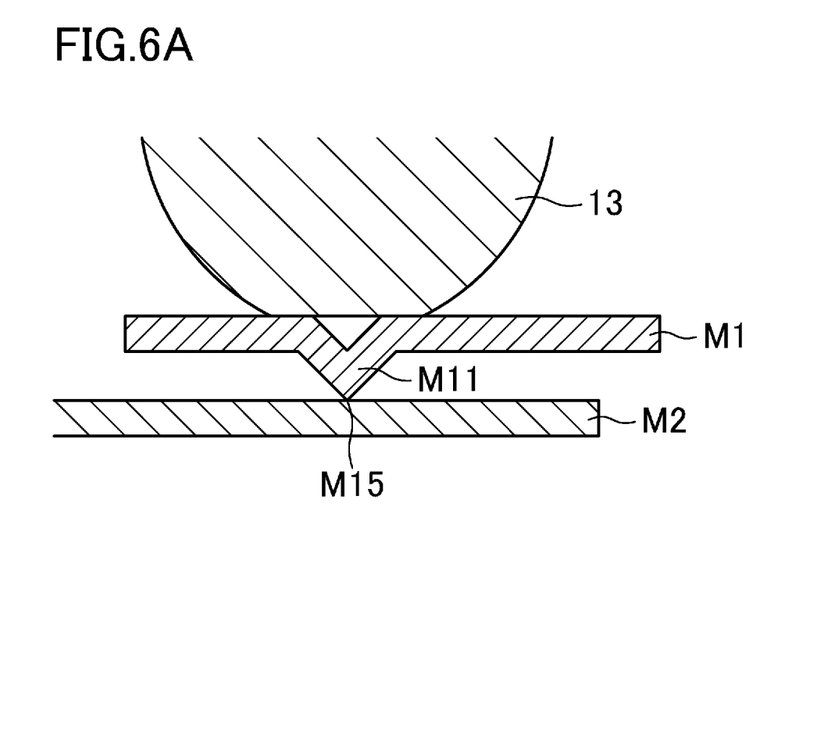
FIG. 6A is a cross-sectional view schematically illustrating a portion near a contact position of a welding electrode and a plate-shaped member in a state in which the welding electrode is brought into pressure contact with the plate-shaped member before energization performed.
Figure 6B:
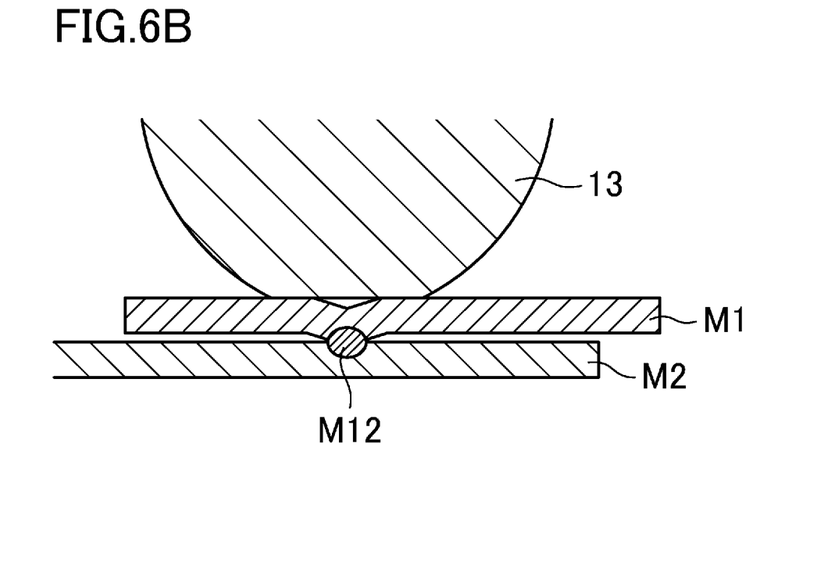
FIG. 6B is a view illustrating a state immediately after a start of energization in FIG. 6A.
Figure 6C:
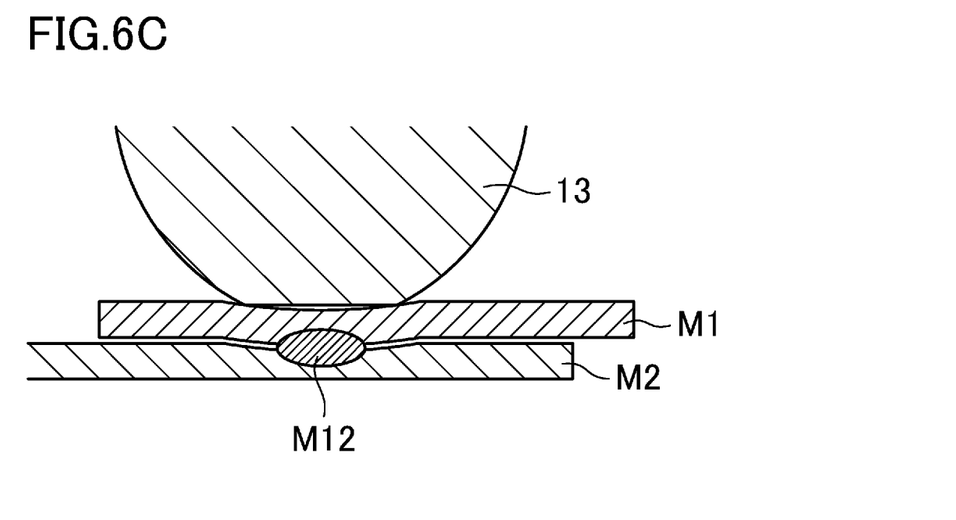
FIG. 6C is a view illustrating a state in which welding has been sufficiently performed after a predetermined time had elapsed since a start of energization in FIG. 6A.
Figure 6D:
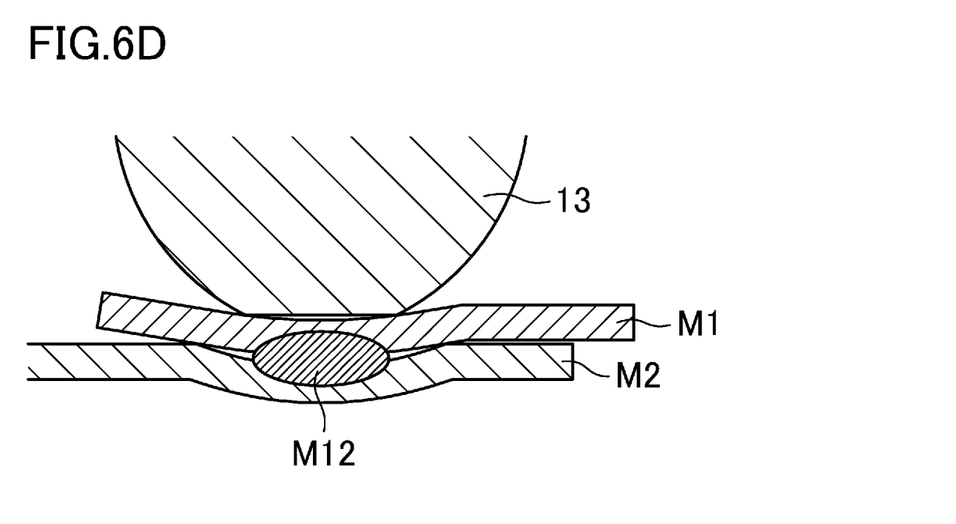
FIG. 6D is a view illustrating a state in which a time has been further elapsed after a predetermined time had elapsed since a start of energization and welding has been excessively performed in FIG. 6A.

When energization stars, melting of the plate-shaped members M1, M2 starts in the contact point M15 illustrated in FIG. 6A. Then, as illustrated in FIG. 6B, a nugget M12 is formed in the contact point M15. As illustrated in FIG. 6C, the nugget M12 grows as the energization time passes, and then, welding ends. Note that, as illustrated in FIG. 6D, when the nugget M12 grows too much because the energization time is too long, the welding pressure of the welding electrode 13 is too large, or the like, deformation of the plate-shaped members M1, M2 is caused. Note that, for example, when an AC power source of 60 Hz is used, the energization time can be set to, for example, 5 cycles or more and 30 cycles or less in view of ensuring sufficient nugget growth and reducing deformation of the plate-shaped members M1, M2 or the like.

As described above, the current amount and the welding time are adjusted to be proper by the control section of the power supply device 15 while holding a proper welding pressure of the welding electrode 13, and welding of the plate-shaped members M1, M2 is completed.

A second and other embodiments according to the present disclosure will be described in detail below. Note that, in description of the following embodiments, the same component as a corresponding component of the first embodiment will be denoted by the same reference sign as that of the corresponding component, and detailed description thereof will be omitted.

Second Embodiment

Figure 7:
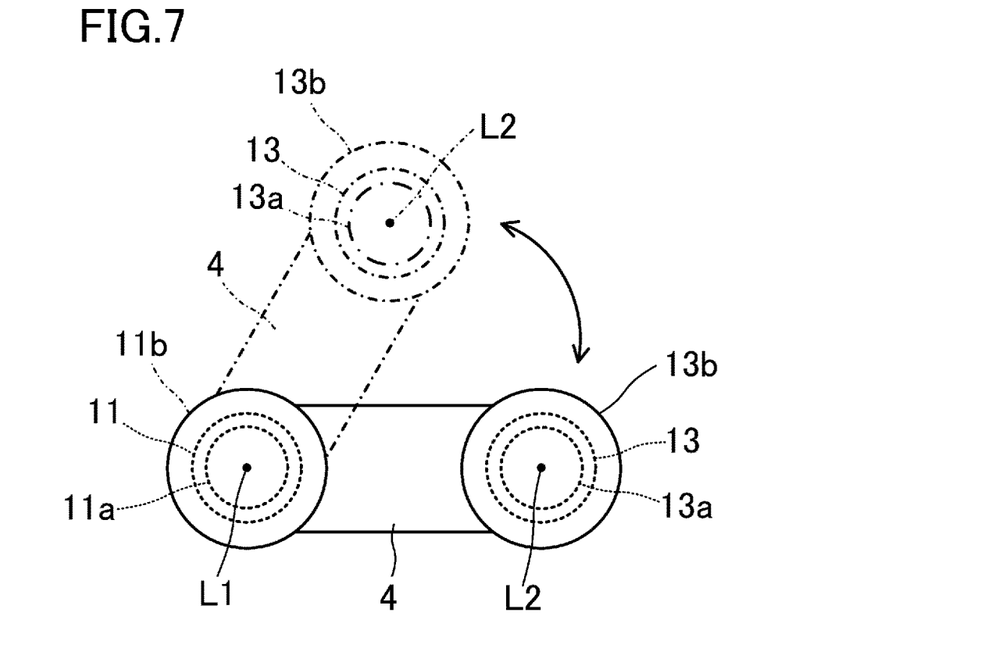
FIG. 7 is a schematic view illustrating a configuration of an indirect spot welding apparatus according to a second embodiment.

The welding electrode 13 may be configured to be not only movable in the axial center L2 direction but also rotatable around the axial center L1 of the ground electrode 11. Specifically, for example, as illustrated in FIG. 7, with the axial center L1 of the ground electrode gun 11b and the ground electrode 11 as a center, the welding electrode gun 13b and the welding electrode 13 may be configured to be rotatable around the axial center L1.

Figure 8:
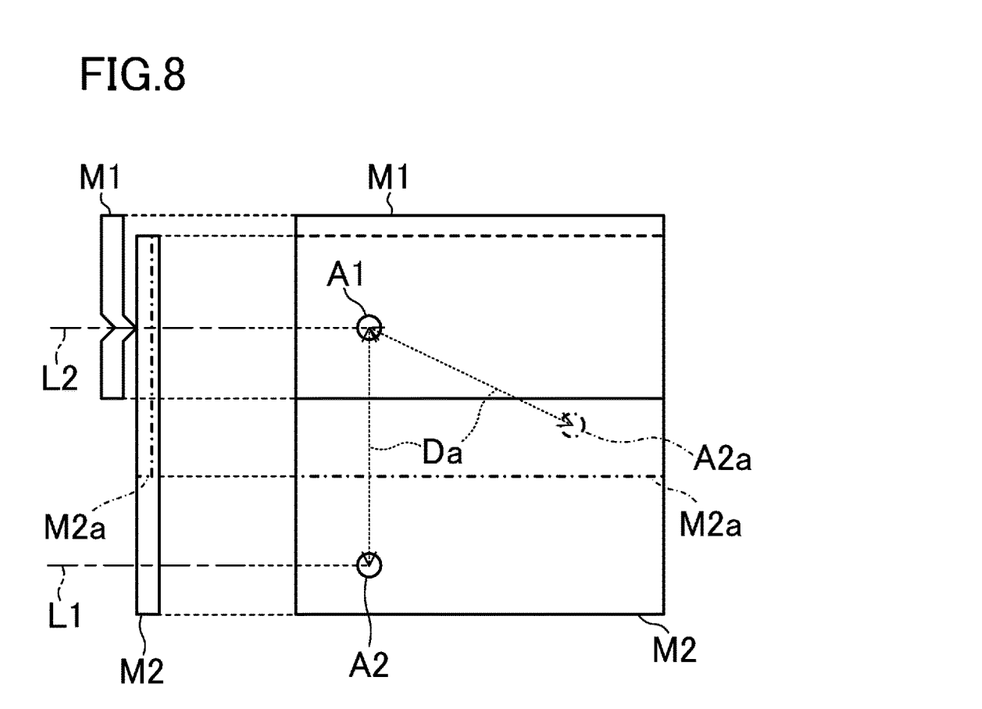
FIG. 8 is a schematic view illustrating how welding is performed using the apparatus of FIG. 7.

According to this configuration, for example, even when a space around a welding position is limited in the objects to be welded, welding can be performed by causing the welding electrode 13 to rotate around the axial center L1 and arranging welding spot positions of the welding electrode 13 and the ground electrode 11. Specifically, for example, as in a plate-shaped member M2a indicated by a dashed line in FIG. 8, when the space around the welding position is limited in the objects to be welded, an inter-welding-spot-position distance Da between a welding spot position A1 of the welding electrode 13 and a welding spot position A2 of the ground electrode 11 is beyond a range of an working space for the objects to be welded in some cases. In the above described case, as illustrated in FIG. 7, the welding electrode 13 is caused to rotate around the axial center L1 of the ground electrode 11 to change the welding spot position of the ground electrode 11 to a position indicated by the reference sign A2a, as illustrated in FIG. 8, and thereby, welding can be performed.

Other Embodiments

In the first embodiment, a configuration in which the raised portion M11 is formed in the plate-shaped member M1 is employed, but a configuration in which the raised portion M11 is not formed may be employed. Note that, in view of limiting the electrical path C1 to reduce a current amount needed for welding, a configuration in which the raised portion M11 is formed as in the first embodiment is preferable. Also, a configuration in which, instead of forming the raised portion M11, some other member, such as a metal piece or the like, is disposed may be employed. Furthermore, as another method, a diameter of the welding electrode end surface 13a of the welding electrode 13 may be minimized to increase an energization density of each of the plate-shaped members M1, M2.

In the first embodiment, the ground electrode 11 is disposed in the same side in which the welding electrode 13 is disposed with respect to the plate-shaped members M1, M2, but may be disposed in the other side in the stacking direction Q1. In this case, the opposed member 12 can be disposed in the same side in which the welding electrode 13 is disposed. Specifically, for example, a configuration in which the positions of the ground electrode 11 and the opposed member 12 are switched around from those in the first embodiment may be employed.

In the first embodiment, the plate-shaped member M2 and the additional plate M3 are held between the ground electrode 11 and the opposed member 12, but it is sufficient that at least one of the plate-shaped members M1, M2 is held between the ground electrode 11 and the opposed member 12. In other words, the ground electrode 11 may be configured to be brought into pressure contact with the plate-shaped member M2, as in the first embodiment, may be configured to be brought into pressure contact with the plate-shaped member M1 with which the welding electrode 13 is brought into pressure contact.

Examples

Figure 9:
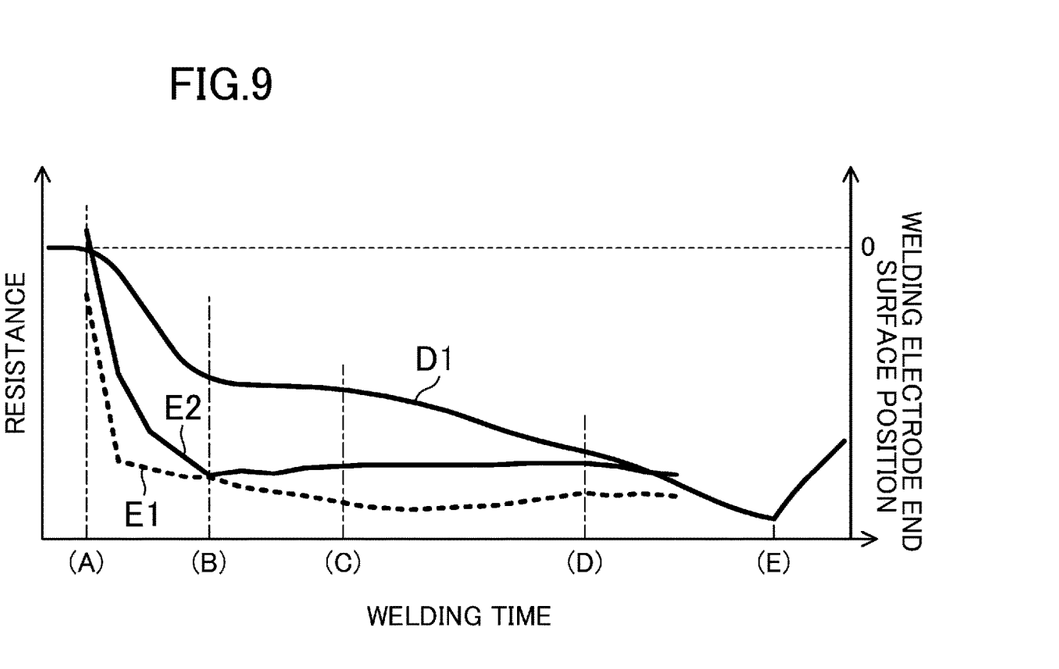
FIG. 9 is a graph illustrating change of a position of a welding electrode end surface and change of a contact resistance value relative to a welding time.

As examples, results obtained when indirect spot welding was performed in the following configuration are illustrated in FIG. 9.

That is, the indirect spot welding apparatus 1 was an apparatus having a configuration in which the ground electrode 11 including the ground electrode end surface 11a having a circular shape (the maximum diameter R1=8 mm), the opposed member 12 including the opposed member end surface 12a having a circular shape (the maximum diameter R2=5 mm), and the welding electrode 13 including the welding electrode end surface 13a having a circular shape (the maximum diameter R3=5 mm) were used and a distance between the ground electrode 11 and the welding electrode 13, that is, a shortest distance between the axial center L1 and the axial center L2, was 45 mm Note that the welding electrode driving section 3 was an air cylinder mechanism, the welding pressure of the ground electrode 11 was 4.5 kN, and the welding pressure of the welding electrode 13 was 1 kN.

Objects to be welded having the configuration illustrated in FIG. 3 were used. Specifically, welding was performed using a steel plate having a thickness of 0.7 mm as the plate-shaped member M1, an ultra-high tensile strength steel plate with a substantially hat-shaped cross section having a thickness of 1.4 mm as the plate-shaped member M2, and an ultra-high tensile strength steel plate having a thickness of 1.4 mm as the additional plate M3.

Note that, in a first example indicated by a broken line E1 in FIG. 9, the raised portion M11 was not provided in the plate-shaped member M1. In a second example indicated by a solid line E2 in FIG. 9, in the plate-shaped member M1, the raised portion M11 having a maximum diameter d=5 mm was formed in a welding position by press molding.

In FIG. 9, a solid line denoted by the reference sign D1 indicates the position of the welding electrode end surface 13a of the welding electrode 13. Specifically, the welding electrode 13 was brought into pressure contact with the plate-shaped member M1, the position of the welding electrode end surface 13a before a start of energization indicated by the reference sign (A) in FIG. 9 was set to 0, and the position of the welding electrode end surface 13a in the energization process S3 was plotted. Note that, at a welding time denoted by the reference sign (E) in FIG. 9, the position of the welding electrode end surface 13a was −1 mm, and at this point (E), the welding electrode 13 was elevated, ad thus, the welding pressure of the welding electrode 13 was set to 0.

The reference signs (B) and (C) in FIG. 9 denote stages in which, for example, the nugget M12 illustrated in FIG. 6B and FIG. 6C was formed. Note that the reference sign (D) denotes a state in which the nugget M12 excessively grew and deformation of the plate-shaped members M1, M2 was observed, for example, as illustrated in FIG. 6D.

Each of the broken line E1 and the solid line E2 in FIG. 9 was drawn by plotting a corresponding one of resistance values (relative values) between the ground electrode 11 and the welding electrode 13 in the first example and the second example with respect to the welding time.

It is understood that, in each of the first and second examples, the resistance value rapidly dropped from a point (A) to a point (B) and formation of the nugget M12 was promoted.

Note that, as the resistance values in the first and second examples are compared with each other, the resistance value in the second example is higher than that in the first example. A reason for this can be considered as follows. As compared to the first example in which the raised portion M11 was not formed, in the second example in which the raised portion M11 was formed, a contact area in which the plate-shaped members M1, M2 were in contact with each other was small. It is accordingly understood that, with the same voltage applied between the ground electrode 11 and the welding electrode 13, the current amount needed for welding could be reduced more in the second example in which the raised portion M11 was formed, as compared to the first example in which the raised portion M11 was not formed.

According to the present disclosure, an indirect spot welding apparatus and a welding method that can contribute reduction in size of the apparatus and can increase efficiency of welding work can be provided, and therefore, the present disclosure is very useful.

What is claimed is:

1. An indirect spot welding apparatus comprising:
   a welding electrode that is brought into pressure contact with one surface of a plurality of stacked plate-shaped members on one side in a stacking direction of the plurality of plate-shaped members, the plurality of plate-shaped members being objects to be welded;
   a ground electrode that is brought into pressure contact with the one surface of the plurality of plate-shaped members on the one side in the stacking direction, in a position shifted from an axial center of the welding electrode; and
   an opposed member disposed coaxially with the ground electrode to be opposed to the ground electrode so as to hold at least one of the plurality of plate-shaped members between the opposed member and the ground electrode,
   wherein
   the ground electrode and the opposed member are mechanically integrated by a C-shaped gun,
   the C-shaped gun includes a ground electrode gun connected to the ground electrode,
   the welding electrode is connected to the ground electrode gun of the C-shaped gun via a contact portion, and
   the welding electrode is movable in a direction parallel to an axial direction of the ground electrode.

2. The indirect spot welding apparatus of claim 1, wherein
   the ground electrode is configured to be movable in the stacking direction of the plurality of plate-shaped members by a ground electrode driving section provided in the ground electrode, and
   the welding electrode is configured to be movable in the stacking direction of the plurality of plate-shaped members independently from movement of the ground electrode by a welding electrode driving section provided in the welding electrode.

3. The indirect spot welding apparatus of claim 1, further comprising:
   a power supply device connected to the welding electrode and the ground electrode, wherein
   the opposed member is insulated from the power supply device.

4. The indirect spot welding apparatus of claim 1, wherein
the plurality of plate-shaped members contact each other via a contact portion disposed at a welding position, and
the welding electrode is movable to be brought into pressure contact with the one surface of the plurality of plate-shaped members proximal the welding position.

5. The indirect spot welding apparatus of claim 2, wherein
the plurality of plate-shaped members contact each other via a contact portion disposed at a welding position, and
the welding electrode is movable to be brought into pressure contact with the one surface of the plurality of plate-shaped members proximal the welding position.

6. The indirect spot welding apparatus of claim 3, wherein
the plurality of plate-shaped members contact each other via a contact portion disposed at a welding position, and
the welding electrode is movable to be brought into pressure contact with the one surface of the plurality of plate-shaped members proximal the welding position.

7. The indirect spot welding apparatus of claim 4, wherein
the plurality of plate-shaped members are two plate-shaped members,
the contact portion comprises a raised portion formed in a surface of a first one of the two plate-shaped members, the raised portion having a raised shape extending toward an opposing surface of a second one of the two plate-shaped members, and
the welding electrode is movable to be brought into pressure contact with the first one of the two members proximal the raised portion.

8. The indirect spot welding apparatus of claim 5, wherein
the plurality of plate-shaped members are two plate-shaped members,
the contact portion comprises a raised portion formed in a surface of a first one of the two plate-shaped members, the raised portion having a raised shape extending toward an opposing surface of a second one of the two plate-shaped members, and
the welding electrode is movable to be brought into pressure contact with the first one of the two members proximal the raised portion.

9. The indirect spot welding apparatus of claim 6, wherein
the plurality of plate-shaped members are two plate-shaped members
the contact portion comprises a raised portion formed in a surface of a first one of the two plate-shaped members, the raised portion having a raised shape extending toward an opposing surface of a second one of the two plate-shaped members, and
the welding electrode is movable to be brought into pressure contact with the first one of the two members proximal the raised portion.

10. An indirect spot welding method comprising:
providing a welding electrode that is brought into pressure contact with one surface of a plurality of stacked plate-shaped members on one side in a stacking direction of the plurality of plate-shaped members, the plurality of plate-shaped members being objects to be welded;
providing a ground electrode that is brought into pressure contact with the one surface of the plurality of plate-shaped members on the one side in the stacking direction, in a position shifted from an axial center of the welding electrode;
providing an opposed member disposed coaxially with the ground electrode to be opposed to the ground electrode so as to hold at least one of the plurality of plate-shaped members between the opposed member and the ground electrode;
a holding step of causing the ground electrode and the opposed member to hold at least one of the plurality of stacked plate-shaped members between the ground electrode and the opposed member; and
a pressure contact step of bringing the welding electrode into pressure contact with the one surface of the plurality of plate-shaped members on the one side in the stacking direction of the plurality of plate-shaped members,
wherein
the ground electrode is brought into pressure contact with the one surface of the plurality of plate-shaped members on the one side in the stacking direction in a position shifted from an axial center of the welding electrode;
the ground electrode and the opposed member are mechanically integrated by a C-shaped gun,
the C-shaped gun includes a ground electrode gun connected to the ground electrode, the welding electrode is connected to the ground electrode gun of the C-shaped gun via a contact portion, and
the welding electrode is movable in a direction parallel to an axial direction of the ground electrode.

11. The indirect spot welding method of claim 10, wherein
an inter-electrode distance between the welding electrode and the ground electrode is 30 mm or more and 150 mm or less.

12. The indirect spot welding method of claim 10, wherein
a welding pressure of the welding electrode is smaller than a welding pressure of the ground electrode.

13. The indirect spot welding method of claim 11, wherein
a welding pressure of the welding electrode is smaller than a welding pressure of the ground electrode.

14. The indirect spot welding method of claim 10, wherein
the plurality of plate-shaped members contact each other via a contact portion disposed at a welding position.

15. The indirect spot welding method of claim 11, wherein
the plurality of plate-shaped members contact each other via a contact portion disposed at a welding position.

16. The indirect spot welding method of claim 12, wherein
the plurality of plate-shaped members contact each other via a contact portion disposed at a welding position.

17. The indirect spot welding method of claim 13, wherein
the plurality of plate-shaped members contact each other via a contact portion disposed at a welding position.

18. The indirect spot welding method of claim 14, wherein
the plurality of plate-shaped members are two plate-shaped members, and
the contact portion comprises a raised portion formed in a surface of a first one of the two plate-shaped members, the raised portion having a raised shape extending toward an opposing surface of a second one of the two plate-shaped members.

19. The indirect spot welding method of claim 15, wherein
the plurality of plate-shaped members are two plate-shaped members, and the contact portion comprises a raised portion formed in a surface of a first one of the two plate-shaped members, the raised portion having a raised shape extending toward an opposing surface of a second one of the two plate-shaped members.

20. The indirect spot welding method of claim 16, wherein the plurality of plate-shaped members are two plate-shaped members, and the contact portion comprises a raised portion formed in a surface of a first one of the two plate-shaped members, the raised portion having a raised shape extending toward an opposing surface of a second one of the two plate-shaped members.

* * * * *